(12) United States Patent
Kuolt

(10) Patent No.: US 9,629,007 B2
(45) Date of Patent: Apr. 18, 2017

(54) METHOD FOR MONITORING AN OPERATING STATE OF A DEVICE AND CORRESPONDING DEVICE AND SYSTEM

(75) Inventor: Harald Kuolt, Deilingen (DE)

(73) Assignee: J. Schmalz GmbH, Glatten (DE)

( * ) Notice: Subject to any disclaimer, the term of this patent is extended or adjusted under 35 U.S.C. 154(b) by 11 days.

(21) Appl. No.: 14/342,623

(22) PCT Filed: Sep. 6, 2012

(86) PCT No.: PCT/EP2012/067398
§ 371 (c)(1),
(2), (4) Date: Mar. 4, 2014

(87) PCT Pub. No.: WO2013/034634
PCT Pub. Date: Mar. 14, 2013

(65) Prior Publication Data
US 2014/0235178 A1 Aug. 21, 2014

(30) Foreign Application Priority Data
Sep. 7, 2011 (DE) .................. 10 2011 082 297

(51) Int. Cl.
*H04B 17/00* (2015.01)
*H04W 24/04* (2009.01)
*B66C 1/02* (2006.01)

(52) U.S. Cl.
CPC ........... *H04W 24/04* (2013.01); *B66C 1/0218* (2013.01)

(58) Field of Classification Search
CPC .............................. B66C 1/0218; H04W 24/04
(Continued)

(56) References Cited

U.S. PATENT DOCUMENTS 5,809,433 A * 9/1998 Thompson et al. ....... 455/575.7
2004/0102869 A1 5/2004 Andersen et al.
(Continued)

FOREIGN PATENT DOCUMENTS

CN 101045517 A 10/2007
CN 101272972 A 9/2008
(Continued)

OTHER PUBLICATIONS

Dec. 2, 2014 Chinese Office Action for Chinese Patent App. No. 201280041164.8.
Oct. 9, 2012 International Search Report for PCT/EP2012/067398.

*Primary Examiner* — Eugene Yun
(74) *Attorney, Agent, or Firm* — Howard & Howard Attorneys PLLC

(57) ABSTRACT

The present invention relates to a method for monitoring the operating state of a device, including a communication circuit and antenna for wireless transmission of signals to and from a base device arranged on the device, including the steps of: transitioning between first and second operating states, wherein the first operating state corresponds to a position of an interfering object in spaced relation to the antenna and the second operating state corresponds to a position of the interfering object closer in relation to the antenna; interference of the signal transmission between the antenna and the base device by the interfering object when in its closer position, wherein the interfering object does not interfere with the signal transmission when in its spaced position; detection of at least one of the occurrence or lack of interference with the signal transmission for determination of a transition between the operating states.

12 Claims, 7 Drawing Sheets

(58) Field of Classification Search
USPC ..................................................... 455/67.13
See application file for complete search history.

(56) References Cited

U.S. PATENT DOCUMENTS

2008/0174076 A1    7/2008  Eisele et al.
2010/0152600 A1*   6/2010  Droitcour ................ A61B 5/05
                                                        600/534
2011/0198403 A1    8/2011  Schaaf et al.

FOREIGN PATENT DOCUMENTS

| CN | 101454236 A      | 6/2009  |
| DE | 10 2006 025 002 A1 | 12/2007 |
| DE | 10 2008 052 812 A1 | 4/2010  |
| EP | 1 840 078 A1     | 10/2007 |
| EP | 2 263 966 A1     | 12/2010 |
| WO | 2010/003636 A1   | 1/2010  |

\* cited by examiner

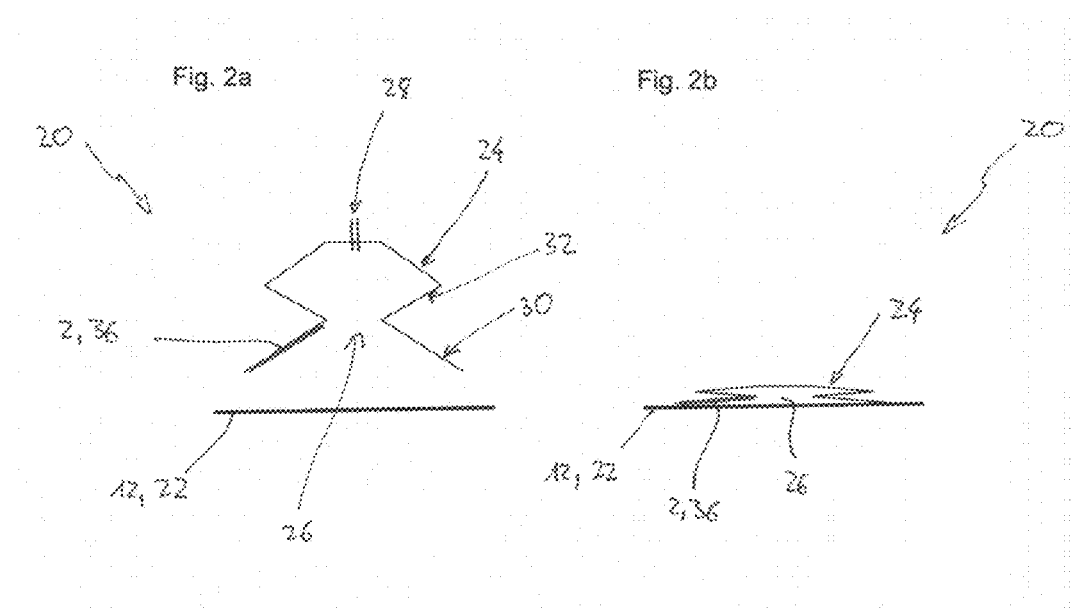

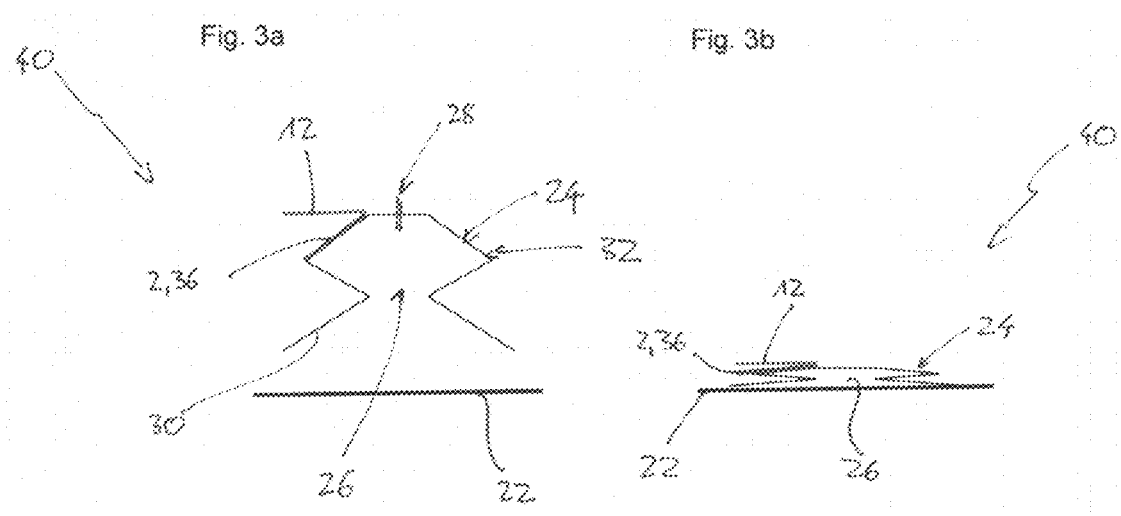

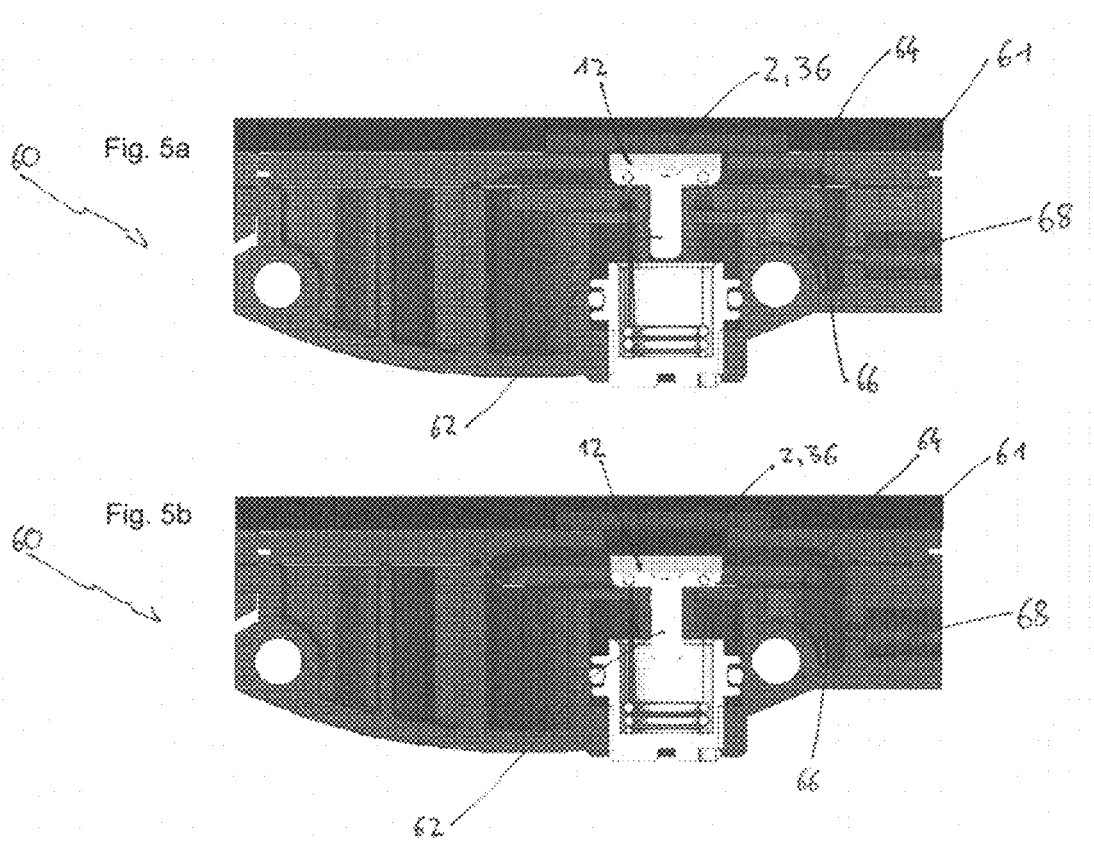

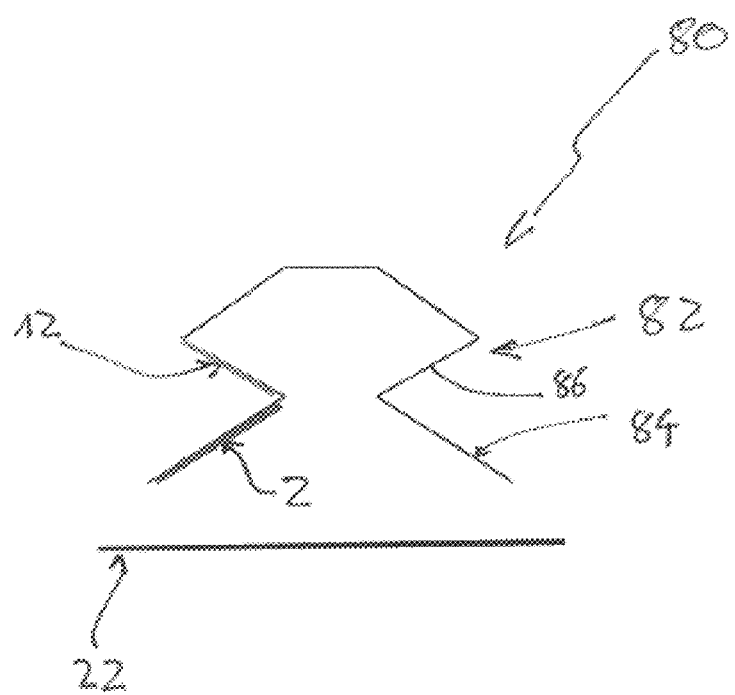

METHOD FOR MONITORING AN OPERATING STATE OF A DEVICE AND CORRESPONDING DEVICE AND SYSTEM

CROSS-REFERENCE TO RELATED APPLICATION

This is a "national stage" application of International Patent Application PCT/EP2012/067398 filed on Sep. 6, 2012, which, in turn, is based upon and claims priority to German Patent Application 10 2011 082 297.6 filed on Sep. 7, 2011.

BACKGROUND OF THE INVENTION

1. Field of Invention

The invention relates to a method for monitoring an operating state of a device, a device for carrying out such a method, and a system for monitoring an operating state of a device.

2. Description of Related Art

In the operation of mechanical devices, there is a need to be able to detect the current operating state of a device. In connection with the present invention, the named operating states can be described by the current distance of two movable components from one another (for example, in the case of devices with components that are movable relative to one another). In the event of a vacuum handling device it is possible to distinguish different operating states (for example, with the help of pressure values of a vacuum supply). Likewise, an operating state can be characterized by the position of a piston or tappet in a cylinder. In the case of a gripping device, for example, it is possible to distinguish between an operating state with a gripped work piece and an operating state without a gripped work piece. The term "operating state" is therefore open to broad interpretation.

Different methods are known in the prior art for detecting operating states. These methods usually require an arrangement of sensors, wherein corresponding cabling is often used for signal transmission. Moreover, power supply from a power supply line or a separate battery is ordinarily required for a sensor. Further, known arrangements for detecting component position have switching features (for example, a dry reed contact switch or a pushbutton switch). However, these components are susceptible to wear and lead to a certain complexity of the detection system.

In published German patent application DE 10 2008 052 812 A1, a vacuum handling device is described wherein an RFID tag with an RFID chip and an antenna for wireless signal transmission is arranged on a component of this device. Between the antenna and the RFID chip, a switching element is provided, such that the antenna can be separated from the RFID chip and the RFID tag can be rendered functionless. The switching element is actuated by the contact of a work piece to be handled on the vacuum handling device, as a result of which the connection to the antenna is established. In this way, it is possible to monitor whether the component provided with the RFID tag is obstructed in the vacuum handling device.

Thus, there remains a need in the art for a simple, reliable, and energy efficient monitoring of operating states of a device. In particular, it is desirable to avoid expensive switch arrangements and conduit systems for power supply and/or data transmission.

SUMMARY OF THE INVENTION

In one embodiment, a transponder is arranged for receiving and sending electromagnetic signals (from and to a base device) on the device to be monitored (for example, on a movable component of the device). The inventive method includes the step of arranging a transponder on the device to be monitored (with the communication circuit and an antenna) for wireless signal transmission from and to a base device. The operating state of the device can then be monitored because the approach of an interfering object interferes with the signal transmission from and/or to the antenna (in particular, between the antenna and the base device). However, no separation of the antenna and communications circuit takes place. In the remote state, the interfering object does not influence the signal transmission. Thus, the approach or remoteness of the interfering object can be detected on or from the antenna. In operation, a first operating state of the device is assigned a position of the interfering object in spaced relation (undisturbed signal transmission) and a second operating state is assigned the closer position of the interfering object (signal transmission with interference) in such a way that the operating state or a transition between operating states can be detected by way of the interference of the signal transmission.

Thus, detection of the operating states of the device is made possible, in particular detection of a transition between two operating states. To this end it is merely necessary to arrange a transponder on the device as described above. Additional switching devices can be dispensed with (for example, break switches, stop switches, or separate proximity sensors). The present invention can be flexibly integrated in practically every type of device whose operating states can be characterized via at least two different positions of an interfering object (for example, the operating states described above). By way of example, devices will be described further below in which the present invention be applied.

In principle, the signal transmission is influenced by the approach of the interfering object. The interference of the signal transmission can take place because the transmission range of the transponder is reduced. However, it is also conceivable that the signals that can be received via the antenna from the transponder be attenuated or reflected. Further, the interference can also be achieved wherein that the antenna is detuned by the approach of the interfering object with respect to the assigned communication circuit, in particular wherein an oscillating circuit characteristic is altered.

The interfering object can, for example, be a metallic plate, a metallic tappet or cylinder, or other metallic body. The interfering object can be a component of the device that is movable with respect to the transponder itself (interfering component). However, it can also be advantageous if an object not included on the monitored device serves as the interfering object (for example, a work piece to be gripped by a gripping device to be monitored).

A transponder, in the present context, is a communication device equipped to receive incoming signals and generate a reply signal. The signal transmission therefore includes a request signal transmitted from the base device to the transponder, and a reply signal that can be read from the transponder to the base device. The reply signal may include a purposeful modulation of the incoming signal, or be furnished by a time-displaced reflecting signal. The transponder can be designed as a passive transponder which, without additional power supply, generates a reply signal only by the received signal. The reply signal is then fed from the power of the request signal. In this case, a power supply of the transponder by cabling or a battery can be dispensed with. In order to achieve these advantages, the transponder can be designed as an (passive) RFID tag. However, it is also conceivable to use other wireless signal transmission techniques, such as Zigbee or Bluetooth.

In one embodiment, the interference of the signal transmission relates to the request signal to be received by the transponder. The request signal is attenuated, or its reception is prevented, via the antenna. If a passive transponder is being used, which acquires the power for the reply signal from the power of the request signal, an interference of the request signal thus prevents an activation of the passive transponder in advance. In this case, a passive RFID tag cannot send a reply signal.

However, in one embodiment, the receipt of the request signal is possible by the antenna of the transponder, but wherein the reply signal of the transponder is interfered with. This design makes it possible to use great transmitting capacities for the request signal and thus avoid errors in the monitoring. The transmitting capacity can be selected such that the transponder is also activated in the event of an approached interfering object, but wherein no sufficient reply signal can be transmitted. Further, a design in which the interference includes the request signal and the reply signal may be provided.

The transponder communicates with a base device, for example a reading device for transponders designed as RFID tags. The base device is not necessarily a component of the device to be monitored. It can, for example, be arranged in a central monitoring unit for the device or for several devices. However, it is also conceivable that the base device itself is a component of the device.

The present invention is also realized by a device which can carry out the inventive method. This device is designed such that it can have at least a first and a second operating state. Arranged on the device is a transponder with a communication circuit and an antenna for wireless signal transmission from and to a base device. The device is designed such that the first operating state corresponds to a position of an interfering object that is spaced away in relation to the antenna. If the device is in its first operating state, the interfering object therefore occupies a position that is spaced away in relation to the antenna. Accordingly, the second operating state corresponds to a position of the interfering object that is closer in relation to the antenna. The transponder is arranged on the device such that the interfering object interferes with the signal transmission between the antenna and the base device when it is in the closer position. The interfering object does not interfere with the signal transmission when the position of said interfering object is in spaced relation. The operating state of such a device can be monitored because an occurrence or omission of an interference of the signal transmission is detected, to which end a base device is used for communication with the transponder.

In one embodiment, the device has a component that can be moved with respect to the transponder, or a section that can be moved with respect to the transponder, wherein the interfering object is arranged on the component or section or is formed by the component or section itself. For example, the interfering object may include a metal plate arranged on a movable component or section. If the metal plate approaches the antenna, the signal transmission will be interfered with. Inversely, the transponder can also be arranged on a movable component or section of the device and be movable relative to the interfering object. Further, the transponder and interfering object can each be arranged on movable components of the device.

In one embodiment, the device is designed as a handling device for a work piece, wherein the handling device can be conveyed by mechanical pressure, pneumatic pressure, or negative pressure from the first operating state to the second operating state. In particular, the work piece to be handled can constitute the interfering object. The transponder is arranged on a section of the device, which is brought close to the work piece for the purpose of handling, and, upon release of the work piece, is spaced away from it.

In one embodiment, the device is designed as a gripping or clamping device for holding a workplace in place, wherein the second operating state corresponds to a gripped or held work piece. In particular, the device is vacuum gripper with an elastic suction body, designed in the style of a plunger. If such a suction gripper is pressed mechanically against the work piece, the transponder approaches the work piece serving as an interfering object. An approach of the transponder to the work piece can also be achieved by applying negative pressure to the suction chamber limited by the suction body, and thereby deforming the suction body that is in contact with the work piece. However, the interfering object can also be formed by a section of the suction gripper itself, or be arranged thereupon, with the suction gripper approaching the transponder in the event of gripping the work piece (or as an alternative, removing itself in the event of the gripping of the transponder).

The present invention can also be used as a length measurement device. In operation, the first operating state corresponds to a first measurement position and the second operating state corresponds to a second measurement position (of the length measurement device).

In one embodiment, the present invention relates to a pressure switch or a vacuum switch. The switch includes a displaceable piston which limits a pressure chamber, wherein the piston can be displaced by supplying the pressure chamber with excess pressure (or, with negative pressure) between at least a first position and a second position. The piston is pre-stressed in the first position by a spring (for example, a coil spring or elastic membrane). The first position corresponds to the first operating state of the device and the second position corresponds to the second operating state of the device. The transponder can be arranged on the device such that the piston is spaced away from the transponder in its first position, and is closer to the transponder in its second position. In one embodiment, the interfering object is arranged on the piston, or is formed by the piston itself.

The present invention also relates to a device for determining position. In operation, different positions correspond to different operating states of the device. A force measurement device is also conceivable. In operation, a movable component is deflected against a defined pretension. Different deflection positions thus correspond to different operating states. This also enables the device to be used for indication of wear. For example, a spring can pre-stress the interfering object and transponder in a position where they are close to one another. In the event of wear of the spring, the interfering object and transponder move away from one another and there is no interference with the signal transmission.

In addition, the present invention includes a system for monitoring the operating state of a device. This system includes a central base device for wireless signal transmission to and from the transponders for monitoring one (or several) devices.

An especially cost-effective and energy efficient monitoring can be achieved with the present invention by designing the transponder as a passive RFID tag with an RFID chip and an antenna connected to said transponder for signal transmission.

Further details and advantageous embodiment of the invention can be found in the following description, with the assistance of which the embodiments of the invention shown in the figures are described and explained in greater detail.

BRIEF DESCRIPTION OF THE DRAWINGS

Other objects, features and advantages of the present invention will be readily appreciated as the same becomes better understood after reading the subsequent description taken in connection with the accompanying drawings wherein:

FIG. 2a shows a schematic representation of an inventive suction gripping device spaced from a work piece;

FIG. 2b shows a schematic representation of the inventive suction gripping device of FIG. 2a in contact with a work piece;

FIG. 3a shows a schematic representation of a further inventive suction gripping device spaced from a work piece;

FIG. 3b shows a schematic representation of the inventive suction gripping device of FIG. 3a in contact with a work piece;

FIG. 5a shows an inventive device in the form of a vacuum switch in a second operating state;

FIG. 5b shows the inventive device of FIG. 5a in a first operating state;

FIG. 7 shows a diagram of yet another inventive suction gripping device.

DETAILED DESCRIPTION OF THE EMBODIMENTS OF THE INVENTION

Figure 1A:
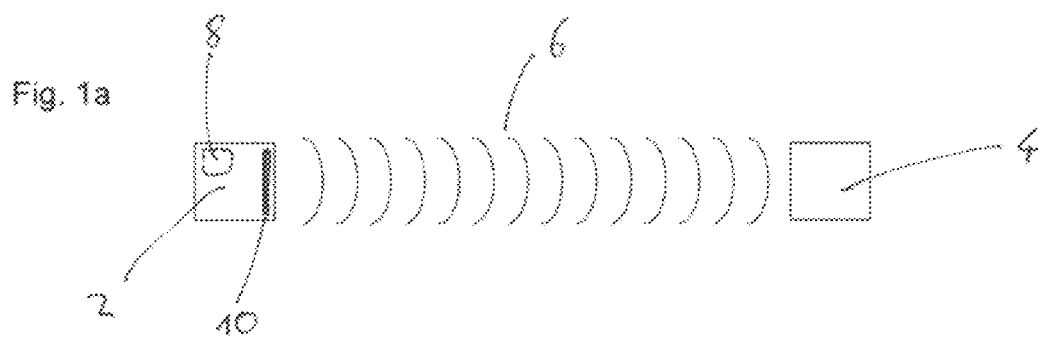
FIG. 1a shows a diagram for explanation of the signal transmission.

In the following description, identical components or components that correspond to one another, are provided with the same reference numbers. To explain the wireless signal transmission, FIG. 1a shows a transponder 2, which is designed for wireless signal transmission of signals from and to a base device 4. In FIG. 1a, an electromagnetic signal 6 is indicated from the transponder 2 to the base device 4. The transponder 2 includes a communication circuit 8 as well as an antenna 10, which is connected to the communication circuit 8.

Figure 1B:
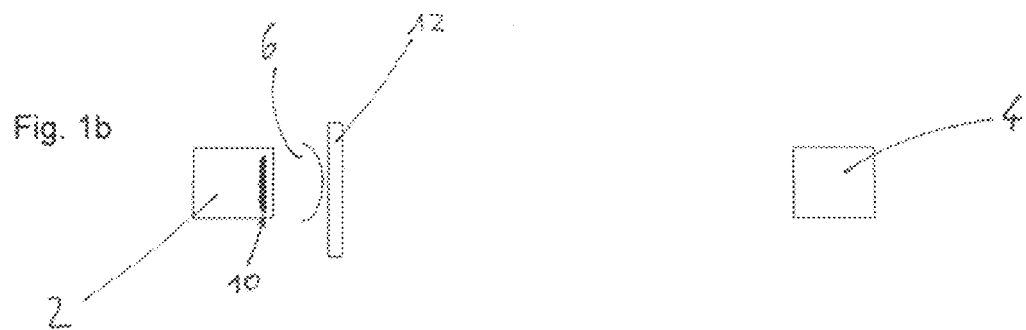
FIG. 1b shows a diagram for explanation of interference of the signal transmission.

In the case of FIG. 1b, an interfering object 12 is arranged in the proximity of the antenna 8 such that there is interference with the transmission of the signal 6 from the transponder 2 to the base device 4.

The present invention can be used in a plurality of different devices designed such that the inventive method can be carried out. With the assistance of FIGS. 2 through 7, different devices will be described as exemplary concretizations and exemplary embodiments of the inventive idea.

FIGS. 2a and 2b show a suction gripping device 20 which serves the purpose of gripping an in particular metallic work piece 22. In the shown example, the work piece 22 is a metallic sheet extending in planar manner. The suction device 20 has an elastic, bell-like suction body 24. The body limits a suction chamber 26, which can be evacuated through a vacuum guide 28 when the suction body 24 is in contact with the suction chamber for receiving the work piece 22. The suction body 24 has a sealing lip section 30 for sealing contact on the work piece 22. A bellows-like strangulated compression section 32 of the suction body 24 adjoins said sealing lip section. If the suction gripping device 20 for gripping the work piece 22 presses on said work piece 22, the elastic suction body 24 can be compressed in the direction of the work piece 22. In operation, the sealing lip section 30 approaches the work piece 22 and the compression section 32 is pressed in the direction of the sealing lip section 30 and, if necessary, comes into contact with the sealing lip section. This is illustrated in FIG. 2b.

The compression of the suction body 24 can take place by mechanically pressing the entire suction gripping device 20 on the work piece 22. However, it is also conceivable that the suction body 24 merely comes into contact with the work piece 22 with the sealing lip section 30 and then the sealing delimited suction chamber 26 is evacuated through the vacuum guide.

The suction device 20 has thus two signalized operating states. In a first operating state, the suction body 24 occupies its relaxed position, as shown in FIG. 2a. A second operating state is defined in the compressed state of the suction body 24, as shown in FIG. 2b. As explained above, this compressed state (second operating state) is attended with a contact of the work piece 22 to be gripped with the suction body, and with an exertion of a mechanical pressure on the suction gripping device 20 and/or a negative pressure in the suction chamber 26. In addition, the suction gripping device 20 has a transponder 2 which is designed as an RFID tag 36 as known in the art. The RFID tag 36 is arranged on the sealing lip section 30 of the suction body 24 (for example, bonded thereto).

The metallic work piece 22 constitutes an interfering object 12 as defined in FIG. 1b. If the suction gripping device 20 is spaced away from the work piece 22 to be gripped (and thus in its first operating state), the work piece 22 does not have an interfering effect on a signal transmission between a base device and the antenna of the RFID tag 36. If the suction gripping device 20 for gripping the work piece 22 is pressed on the work piece, and in operation occupies its second operating state (FIG. 2b), the work piece 22 is in a position close to the RFID tag 36. The work piece 22 (which is also acting as an interfering object 12) then interferes with a signal transmission between the RFID tag 36 and a base device.

Hence, by detection of the occurrence or lack of interference with the signal transmission from and to the RFID tag 36, it is possible to distinguish between the first operating state (FIG. 2a) and the second operating state (FIG. 2b). Thus, by reading the RFID tag 36 it can be determined whether a work piece 22 is being held in place by the suction gripping device 20.

In the case of the suction gripping device 20, the transponder 2 (RFID tag 36) is arranged on a movable section (sealing lip section 30) of the suction gripping device 20. The interfering object 12 is not a component of the suction gripping device 20, but rather is formed by the work piece 22 to be gripped.

Another design is outlined in FIGS. 3a and 3b. These figures show a suction gripping device 40 whose design essentially corresponds to that of suction gripping device 20. The suction gripping device 40 in turn, has an elastic suction body 24 with a compression section 32 which can be compressed through pressure (mechanical pressing or evacuation through the vacuum guide 28).

In operation, the relaxed state of the suction body 24 corresponds to the first operating state of the suction gripping device 40 (FIG. 3a). The second operating state corresponds in turn to the compressed state of the suction body 24 and is (as discussed above) connected to a received or gripped work piece 22 (compare FIG. 3b). However, in contrast to the suction gripping device 20, the suction gripping device 40 includes the interfering object 12, the interfering object is arranged on the suction gripping device 40 (for example, on a gripper base) such that the compression section 32 of the suction body 24 in the first operating state of the suction gripping device 40 is spaced away from the interfering object 12. In the second operating state, the compression section 32 is closer to the interfering object 12 due to the compression of the suction body 24. The transponder 2, which is designed as an RFID tag 36, is arranged on the compression section 32. Consequently, the transponder 2 is spaced away from the interfering object 12 in the first operating state of the suction gripping device 40 and in the second operating state is closer to the interfering object 12. This makes it possible, through the detection of an occurrence or lack of interference with the signal transmission to the transponder 2, to determine whether the work piece 22 is being held in place by the suction gripping device 40. Since the metallic interfering object 12 is arranged on the suction gripping device 40, a gripping of work pieces 22 can also be detected, which cannot act as interfering objects 12 themselves (for example, in the case of non-metallic work pieces 22).

In contrast to the suction gripping device 20, both the interfering object 12 and the transponder 2 are arranged on the suction gripping device 40 such that they can be moved relative to one another and can occupy a first position, corresponding to the first operating state, as well as a second position, corresponding to the second operating state.

Figure 4A:
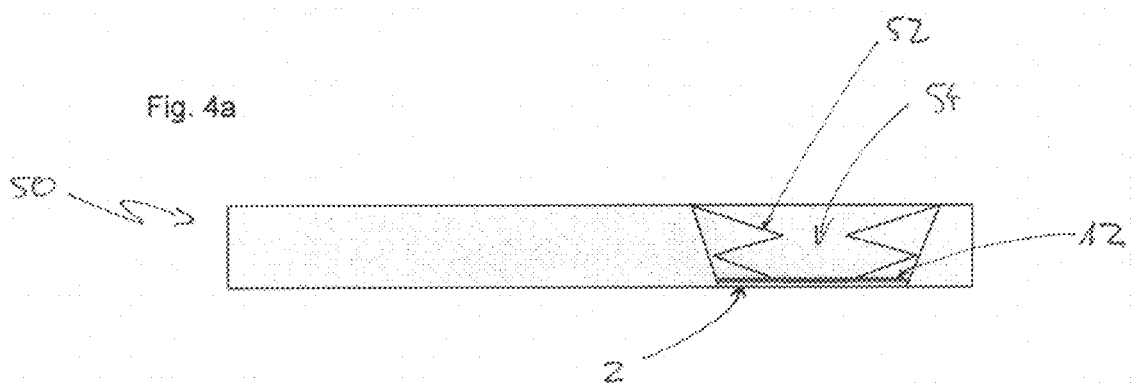
FIG. 4a shows a further inventive device in a first operating state.
Figure 4B:
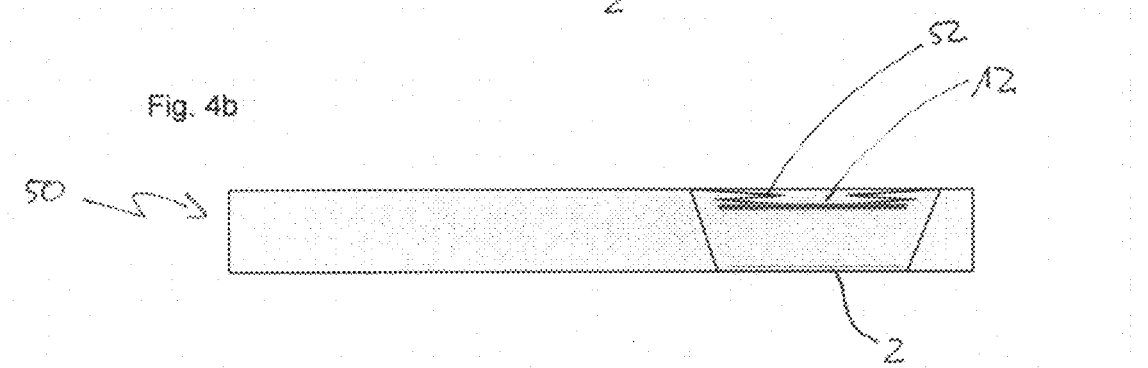
FIG. 4b shows the inventive device of FIG. 4a in a second operating state.

In the case of the device 50 shown in FIGS. 4a and 4b, the interfering object 12 is arranged displaceably with respect to the transponder 2 on the device. A lifting device 52 is provided for displacement of the interfering object 12. This may include a bellows which limits an evacuable pressure chamber 54. If the pressure chamber 54 is evacuated, the bellows contracts; the lifting device 52 displaces the interfering object 12 to a position spaced away from the transponder 2. If pressure is applied to the pressure chamber 54 (for example, ambient pressure) the bellows is in its expanded position and the interfering object 12 is in contact with the transponder 2. As a result, two operating states of the device 50 are defined, as shown in FIGS. 4a and 4b.

The device 50 can also be designed as a suction plate. In operation, the pressure chamber 54 is in flow connection with a suction opening of the suction plate. If there is no work piece to be suctioned on the suction plate, then no vacuum can be established in the pressure chamber 54 and the interfering object 12 is in contact with the transponder 2. Therefore, the so-called second operating state as described above is present. In the case of the suction plate, this indicates no work piece to be suctioned is present or no vacuum can be established and there is a malfunction. However, if a work piece to be suctioned is correctly on the suction plate, a negative pressure can be established in the pressure chamber 54 and the interfering object 12 is removed from the transponder 2. Conversely, the first operating state indicates an interference-free operation of the suction plate.

FIGS. 5 and 5b show the realization of the present invention in a vacuum switch 60. The vacuum switch 60 includes a housing 61 in which a tappet 62 is displaceably arranged. The tappet 62 is arranged on an elastic membrane 64 which limits a pressure chamber 66. The pressure chamber 66 is flow and pressure connected to a vacuum connection 68. Further, a transponder 2 is arranged on (or in) the housing 61, the transponder can be designed as an RFID tag 36. With a passive RFID tag, it can be integrated in the housing 61 (for example, cast) since no separate power supply is required for the passive RFID tag.

The transponder 2 is arranged in the housing 61 such that the interfering object 12 is in a position close to the transponder 2 when the elastic membrane 64 is in its relaxed state. This defines a so-called second operating state as described above and is shown in FIG. 5a.

If sufficient negative pressure is applied to the pressure chamber 66 via the vacuum connection 68, the elastic membrane 6 limiting the pressure chamber 66 is deformed for reduction of the volume and thus the interfering object 12 is moved away from the transponder 2. This defines a so-called first operating state of the device 60 as described above and is shown in FIG. 5b.

The negative pressure necessary for the transition of the device 60 from its second operating state (FIG. 5a) to its first operating state (FIG. 5b) can be determined via the elasticity of the membrane 64. The device 60 can therefore be used as a vacuum switch, which in the case of a sufficient negative pressure applied on the vacuum connection 68, permits a signal transmission from the transponder 2 to a base device. The transmitting signal can then serve as a switching signal.

Figure 6:
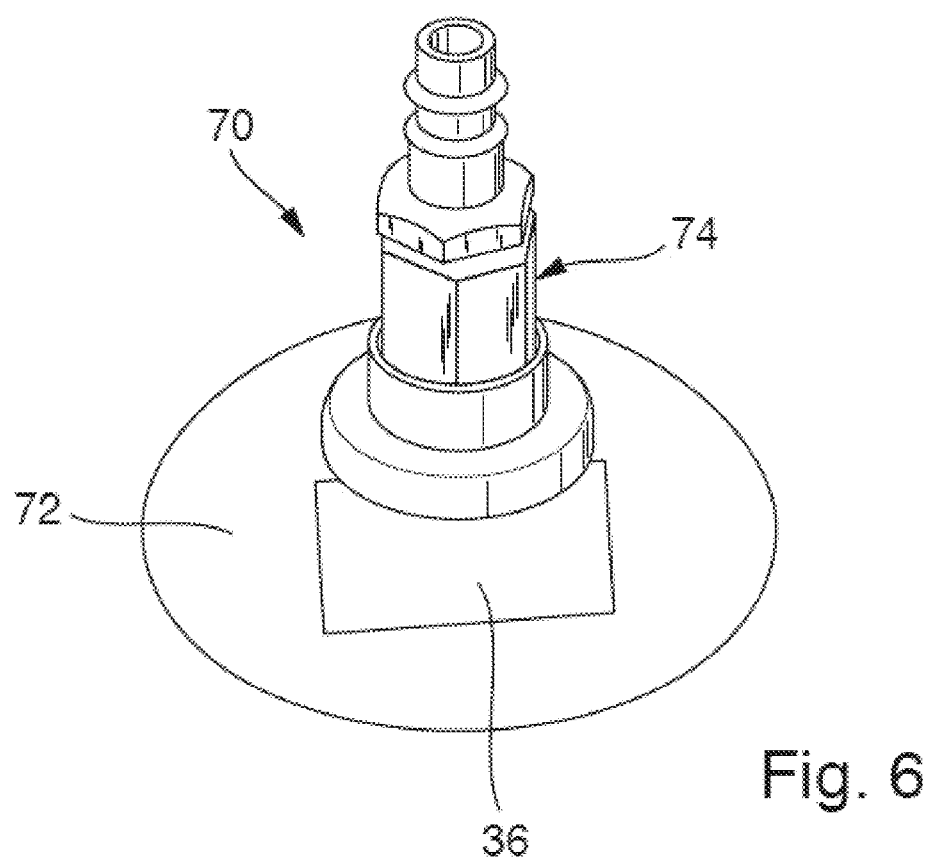
FIG. 6 shows a further inventive suction gripping device.

FIG. 6 shows a suction gripper 70 as one embodiment of the present invention. The suction gripper 70 has an elastic plunger 72 which limits a suction chamber that can be evacuated in the event of a work piece being in contact. An RFID tag 36 is bonded to the plunger 72 (for example, on a surface of the thin and elastic plunger 72 turned away from the suction chamber). The plunger 72 opens into a rigid gripper base 74. FIG. 6 shows the suction gripper 70 in its first operating state. If the suction gripper 70 with its elastic plunger 72 is pressed against a metallic work piece, for example, the RFID tag 36 gets closer to the work piece to be gripped due to the elastic deformation of the plunger 72. This defines the second operating state of the suction gripper 70. A metallic work piece can serve as an interfering object as described above and interfere with a signal transmission from or to the RFID tag 36.

FIG. 7 outlines a suction gripping device 80, which has a bell-like suction body 82 similar to the suction gripping device 20 shown in FIGS. 2a and b. The elastic suction body 82 has a sealing lip section 84 for coming into contact with the work piece 22 to be held in place. The sealing lip section 84 adjoins a compression section 86 as a bellows. If the suction body 82 is pressed against the work piece 22, in the case of compression of the suction body 82, the compression section 86 gets closer to the sealing lip section 84. Via the relative position of the compression section 86 and the sealing lip section 84 to one another, therefore a first operating state (spaced position) and a second operating state (compressed position) can be characterized. Consequently, the present invention can be realized because a transponder 2 is arranged on the sealing lip section 84 and an interfering object 12 is arranged on the compression section 86. However, an inverse design is also conceivable, in which an interfering object 12 is on the sealing lip section 84 and a transponder 2 is arranged on the compression section 86.

The transponder 2 and the interfering object 12 are designed such that in the first operating state (spaced position) a signal transmission is possible from the transponder 2 to a base device. In the compressed state, the interfering object 12 can interfere with the signal transmission. With the suction gripping device 80, it is also possible to detect the gripping of a work piece 22 which does not serve as an interfering object itself.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method for monitoring the operating state of a handling device for a work piece, wherein the handling device can be brought into contact with a work piece so as to apply mechanical pressure to the work piece, wherein a transponder being arranged on the handling device including a communication circuit and an antenna for wireless signal transmission from and to a base device,
    wherein an interfering object is provided separate from the transponder, and
    wherein the method further comprises the steps of:
    transitioning the handling device between a first operating state and a second operating state, wherein the first operating state corresponds to a position of an interfering object in spaced relation to the antenna and the second operating state corresponds to a position of the interfering object closer in relation to the antenna;
    interfering with the signal transmission between the antenna and the base device by the interfering object when it is in its closer position, wherein the antenna always remains electrically connected to the communication circuit;
    wherein the interfering object does not interfere with the signal transmission when the interfering object is in its spaced position;
    detecting at least one of the occurrence or lack of interference with the signal transmission for determination of a transition between the operating states.

2. The method as set forth in claim 1, wherein the signal transmission includes a request signal from the base device to the transponder and a reply signal that can be triggered as a result from the transponder to the base device, wherein the interference with the signal transmission relates to the request signal.

3. The method as set forth in claim 1, wherein the signal transmission includes a request signal from the base device to the transponder and a reply signal that can be triggered as a result from the transponder to the base device, wherein the interference with the signal transmission relates to the reply signal.

4. The method as set forth in claim 1, wherein the interference includes at least one of signal attenuation, signal suppression, a decrease in the signal range, or a detuning or modulation of the signal frequency.

5. A handling device for a work piece, wherein the handling device can be brought into contact with a work piece so as to apply mechanical pressure to the work piece, wherein the handling device can occupy at least a first and a second operating state, wherein the handling device includes a transponder with a communication circuit and an antenna for wireless signal transmission from and to a base device, and the first operating state corresponds to a position of an interfering object in spaced relation to the antenna and the second operating state corresponds to a position of the interfering object closer in relation to the antenna,
    wherein the transponder is arranged on the handling device and the signal transmission between the antenna and the base device can be interfered with when the interfering object is closer to the antenna, wherein the antenna always remains electrically connected to the communication circuit; and
    wherein the interfering object does not interfere with the signal transmission when said interfering object is spaced away from the antenna.

6. The handling device as set forth in claim 5, wherein the handling device has a component that can be moved relative to the transponder which includes the interfering object.

7. The device as set forth in claim 5, wherein the handling device has a component that can be moved relative to the transponder which constitutes said interfering object.

8. The handling device as set forth in claim 5, wherein the handling device can be brought from the first operating state to the second operating state by pneumatic pressure.

9. The handling device as set forth in claim 5, wherein the handling device can be brought from the first operating state to the second operating state by negative pressure.

10. A system for monitoring the operating state of a handling device for a work piece, including:
    a handling device for a work piece, wherein the handling device can occupy at least a first and a second operating state and can be brought into contact with a work piece by applying mechanical pressure to the work piece;
    at least one transponder arranged on the device with a communication circuit and an antenna for wireless signal transmission from and to a base device;
    an interfering object which can occupy a position spaced from and a position closer to the antenna of the transponder;
    wherein the position of the interfering object in spaced relation to the antenna corresponds to the first operating state and the position of the interfering object closer in relation to the antenna corresponds to the second operating state; and
    wherein there is interference with the signal transmission between the antenna and the base device when the interfering object is in its closer position, wherein the always remains electrically connected to the communication circuit;
    and the interfering object does not interfere with the signal transmission when the interfering object is in its spaced position.

11. The system as set forth in claim 10, further including a base device for wireless signal transmission from and to the transponder.

12. The system as set forth in claim 11, wherein transponder is a passive RFID tag with an RFID chip and an antenna connected to said transponder.

* * * * *